United States Patent
Morrill et al.

(10) Patent No.: US 10,629,312 B2
(45) Date of Patent: Apr. 21, 2020

(54) LIGHT WATER REACTOR WITH CONDENSING STEAM GENERATOR

(71) Applicant: NuScale Power, LLC, Corvallis, OR (US)

(72) Inventors: Randall W. Morrill, Corvallis, OR (US); Tamas R. Liszkai, Corvallis, OR (US)

(73) Assignee: NuScale Power, LLC, Portland, OR (US)

( * ) Notice: Subject to any disclaimer, the term of this patent is extended or adjusted under 35 U.S.C. 154(b) by 199 days.

(21) Appl. No.: 14/971,687

(22) Filed: Dec. 16, 2015

(65) Prior Publication Data

US 2016/0180975 A1 Jun. 23, 2016

Related U.S. Application Data

(60) Provisional application No. 62/095,922, filed on Dec. 23, 2014.

(51) Int. Cl.
*G21C 1/32* (2006.01)
*G21C 1/08* (2006.01)

(52) U.S. Cl.
CPC ............. *G21C 1/322* (2013.01); *G21C 1/086* (2013.01); *Y02E 30/32* (2013.01)

(58) Field of Classification Search
CPC ................................ G21C 1/322; G21C 1/086
USPC .................................................. 376/362, 406
See application file for complete search history.

(56) References Cited

U.S. PATENT DOCUMENTS

| | | | | |
|---|---|---|---|---|
| 5,053,190 A | * | 10/1991 | Gardner | G21C 1/09 376/307 |
| 2013/0266111 A1 | | 10/2013 | Young et al. | |
| 2013/0279643 A1 | * | 10/2013 | Groome | G21D 1/006 376/378 |
| 2013/0301776 A1 | | 11/2013 | Shargots et al. | |

FOREIGN PATENT DOCUMENTS

| | | |
|---|---|---|
| JP | 2005-233704 A | 9/2005 |
| WO | 2013147971 A1 | 10/2013 |

OTHER PUBLICATIONS

International Search Report and Written Opinion issued in corresponding International Application No. PCT/US2015/066167, dated Apr. 22, 2016, 12 pages.
Zanocco et al., "Self-Pressurization Behavior in Integrated Reactors," International Journal of Heat and Technology. 2003, 21(1):149-55.

* cited by examiner

*Primary Examiner* — Jack W Keith
*Assistant Examiner* — Daniel Wasil
(74) *Attorney, Agent, or Firm* — Perkins Coie LLP

(57) ABSTRACT

A light water reactor for generating power that utilizes circulation of a primary coolant at saturation pressure to cool a nuclear core and transfer heat from the core to a secondary coolant through one or more heat exchangers of a condensing steam generator. The secondary coolant, once heated can drive power generation equipment, such as steam turbines or otherwise, before being condensed and returned to the one or more heat exchangers.

20 Claims, 3 Drawing Sheets

LIGHT WATER REACTOR WITH CONDENSING STEAM GENERATOR

PRIORITY CLAIM

This application claims the benefit of prior U.S. provisional application Ser. No. 62/095,922, filed Dec. 23, 2014, the contents of which are incorporated by reference.

STATEMENT REGARDING GOVERNMENT INTERESTS

This invention was made with Government support under Cooperative Agreement No. DE-NE0000633 awarded by DOE. The Government has certain rights in this invention.

FIELD OF THE INVENTION

This disclosure generally relates to a light water nuclear reactor and, more particularly, to a self-pressurizing light water reactor (LWR).

BACKGROUND OF THE INVENTION

Light water reactors initiate a nuclear fission reaction to heat a coolant that passes through a core, which contains the nuclear fuel for the reaction. In order to operate correctly, e.g., at the proper pressures within a reactor pressure vessel of the reactor module, a pressurizer and pressurizer heaters are mounted within an upper dome of the reactor pressure vessel of LWRs. Moreover, in both pressurized water reactor (PWR) and boiling water reactor (BWR) versions of LWRs, energy from heated coolant is transferred to generate electrical power. In the case of PWRs, such energy is transferred to a working fluid that circulates in an independent fluid circuit internally and externally to the pressure vessel. In the case of BWRs, such energy in the heated coolant (in the form of radioactive steam) is directly used to power a gas expander, e.g., a turbine, to generate electricity. There is a need, however, for an improved light water reactor that can operate with a condensing steam generator and maintain a reduced reactor pressure.

SUMMARY OF THE INVENTION

The present disclosure describes a commercial power light water reactor that utilizes circulation (for example, in some implementations it uses natural circulation, not driven by a pump) of a primary coolant at saturation pressure to cool a nuclear core and transfer heat from the core to a secondary coolant through one or more heat exchangers of a condensing steam generator. The secondary coolant, once heated (e.g., to steam, superheated steam or otherwise), can drive power generation equipment, such as steam turbines or otherwise, before being condensed and returned to the one or more heat exchangers.

A preferred version of the invention includes a nuclear reactor system (e.g., a nuclear reactor) that includes a power light water reactor (LWR). In some versions, as described more fully below, the LWR utilizes a condensing steam generator onto which a primary coolant (in vapor form) condenses to transfer heat to the secondary coolant.

In some versions, the primary coolant may circulate through the LWR at a saturation pressure of the coolant.

In some implementations, a top liquid level of the primary coolant, during normal operation of the LWR, is below the condensing steam generator within the reactor.

The saturation pressure of the primary coolant may be maintained by a flow of a secondary coolant through the LWR that removes heat from the primary coolant.

In some versions, the reactor core 20 is submerged within a liquid primary coolant, such as water. The primary coolant may include boron or other additives; however, other implementations of the LWR may be boron-free.

In preferred examples, a liquid level of the liquid primary coolant is located at or just above a top of the core, and below the steam generator. During normal operation, the liquid primary coolant boils in or above the core and vaporizes into vapor primary coolant, which, when heated, rises into a channel formed within the riser positioned above the core. The vapor primary coolant contacts heat exchangers of the steam generator and condenses.

In a preferred version, the condensed primary coolant is circulated (e.g., by gravity) down an annulus toward a bottom portion of the reactor vessel.

In accordance with some versions, the primary coolant forms a primary coolant circuit that extends from the pool of water in the bottom portion of the reactor pressure vessel, up through the interior of the steam generator (as channeled by the riser), down through a space defined between the steam generator (and/or the riser) and the sidewalls forming the reactor pressure vessel, and finally returning to the pool again at the bottom of the reactor pressure vessel.

Various implementations described in this disclosure may include none, one, some, or all of the following features. For example, in some versions of the invention a self-pressurizing LWR may reduce a primary coolant operating pressure to produce superheated steam, which may in turn allow for a reduced reactor pressure vessel thickness for a pressure rating of between about 1,150 psia and about 1,750 psia for a range of operating pressures between about 1,000 psia and 1,550 psia (e.g., 1,650 psia), as vessel thickness is proportional to primary coolant operating pressure. Thus, a cost of the reactor pressure vessel may be reduced. This reduced primary pressure may also result in less stored energy during an accident event when an emergency cooling system actuates, thereby resulting in a reduced peak and design pressures for the containment vessel. As another example, a reduced containment peak pressure may be directly proportional to containment vessel thickness. Thus, a thinner containment vessel may result in cost savings.

As another example, the self-pressurizing LWR may utilize a condensing steam generator, which may eliminate (e.g., all or partially) contaminated reactor coolant from exiting the reactor pressure vessel and reaching systems that are typical of steam systems in BWRs. A LWR with a condensing steam generator may have reduced manufacturing costs, as pressure loss of a primary coolant may be reduced in a self-pressurizing LWR.

In some examples, the condensing steam generator may be of a variety of shapes to fit within the reactor pressure vessel. For example, the reactor pressure vessel may be shorter and wider, as no significant thermal driving head is needed between the heat source or the core and the heat sink of the condensing steam generator. As a further example, a shorter reactor pressure vessel may significantly reduce seismic accelerations, shorten control rod shafts, reduce a reactor building pool size, reduce the reactor building height, and/or reduce a size of reactor module crane. Further a shorter steam generator and reactor pressure vessel may result in shorter piping and smaller thermal differential expansion, thereby allowing the minimization of welds and inspection requirements.

As another example, control systems for the self-pressurizing LWR may be less complex, as pressurizer controls may be eliminated.

Furthermore, the self-pressurizing LWR may have reduced fluence on the containment vessel, which can eliminate vessel embrittlement concerns.

As a further example, boron may be eliminated (e.g., all or substantially) from a reactor coolant, which may benefit long term operation and reduce costs.

BRIEF DESCRIPTION OF THE DRAWINGS

Preferred and alternative examples of the present invention are described in detail below with reference to the following drawings.

DETAILED DESCRIPTION OF THE PREFERRED EMBODIMENT

The details of one or more implementations of the subject matter described in this specification are set forth in the accompanying drawings and the description below.

Figure 1:
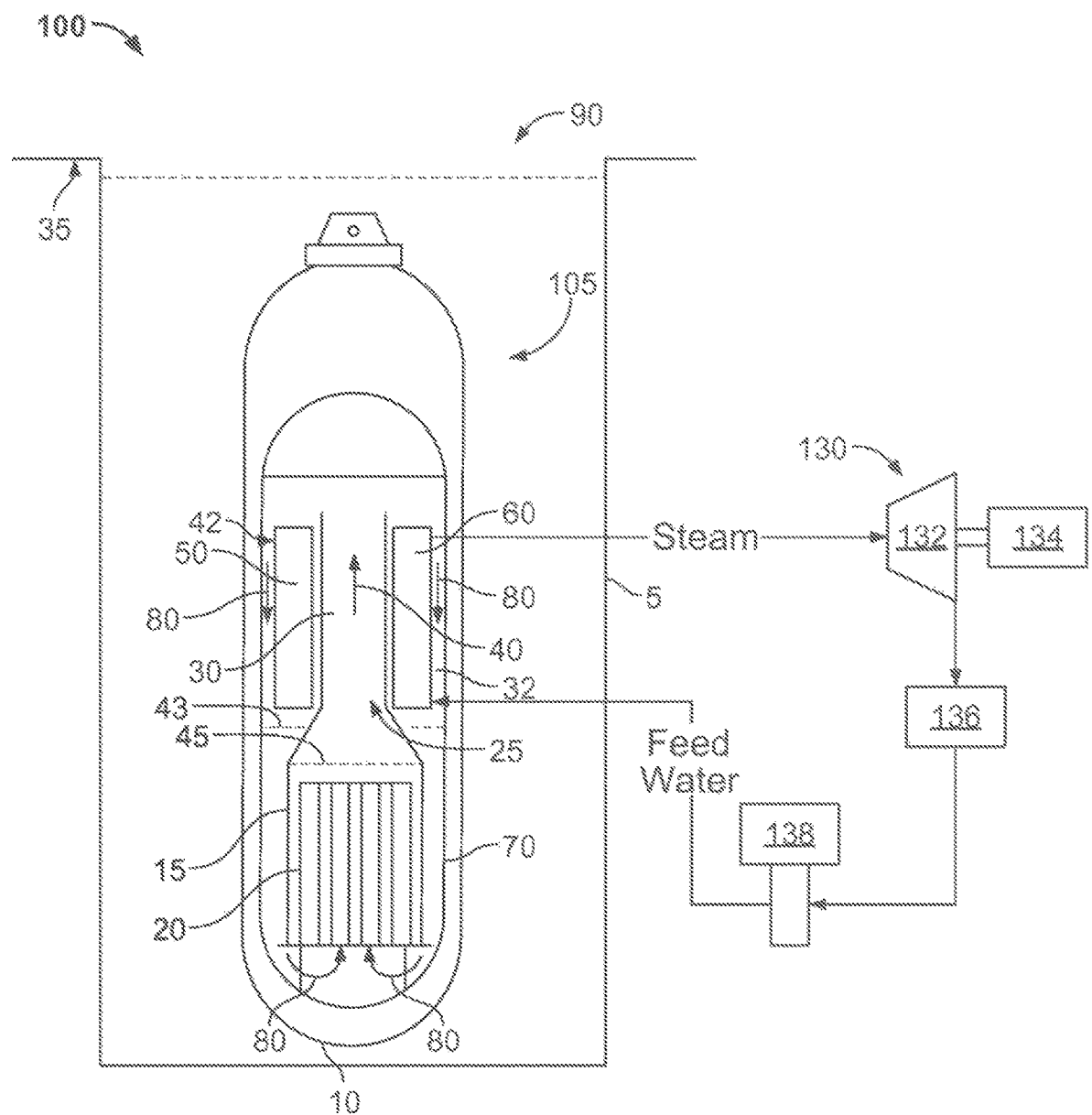
FIG. 1 is a schematic diagram illustrating an example nuclear reactor system that includes a self-pressurizing LWR in accordance with the present disclosure.

FIG. 1 is a block diagram illustrating a nuclear reactor system 100 (e.g., a nuclear reactor) that includes a commercial power light water reactor (LWR) 105 that utilizes circulation (e.g., natural) of a primary coolant to cool a nuclear core and transfer heat from the core to a secondary coolant through one or more heat exchangers. The secondary coolant (e.g., water), once heated (e.g., to steam, superheated steam or otherwise), can drive power generation equipment, such as steam turbines or otherwise, before being condensed and returned to the one or more heat exchangers. In some versions, as described more fully below, the LWR 105 utilizes a condensing steam generator 42 onto which the primary coolant (in vapor form) condenses to transfer heat to the secondary coolant.

The primary coolant may circulate through the LWR 105 (e.g., by natural convection) at a saturation pressure of the coolant, thereby eliminating or reducing a need for a pressurizer in a top portion (e.g., steam dome) of the LWR 105. In some implementations, a top liquid level 43 of the primary coolant, during normal operation of the LWR 105, is below the condensing steam generator 42 within the reactor. In the illustrated example as in FIG. 1, the top liquid level is below the bottom of the condensing steam generator 42, so that the condensing steam generator is not within the liquid.

The saturation pressure of the primary coolant may be maintained by a flow of a secondary coolant (e.g., feedwater) through the LWR 105 that removes heat from the primary coolant. For instance, when heat generated in a core 20 and heat removed by the steam generator 42 are in balance (e.g., approximately equal), the saturation pressure may be maintained. Thus, control of a flow of the secondary coolant (e.g., by pumps, valves, bypass, or otherwise) may be utilized to maintain the balance (e.g., to self-pressurize to a saturation pressure of the primary coolant).

With respect to the nuclear reactor system 100, the reactor core 20 is positioned at a bottom portion of a reactor vessel 70 (which, in the illustrated example, is cylinder-shaped or capsule-shaped). Reactor core 20 includes a quantity of nuclear fuel assemblies, or rods (e.g., fissile material that produces, in combination with control rods, a controlled nuclear reaction), and optionally one or more control rods (not shown). In some implementations, nuclear reactor system 100 is designed with passive operating systems (e.g., without a circulation pump for the primary coolant) employing rising heated liquid in the direction of arrow 40 and falling cooled liquid in the direction of arrows 80 to ensure that safe operation of the nuclear reactor 100 is maintained during normal operation or even in an emergency condition without operator intervention or supervision, at least for a period of time that may be predefined or finite.

A containment vessel 10 (which, as with the reactor vessel, in the illustrated example is cylinder-shaped or capsule-shaped) surrounds reactor vessel 70. In the illustrated example, the containment vessel is partially or completely submerged in a reactor pool, such as below waterline 90 (which may be at or just below a top surface 35 of the bay 5), within reactor bay 5.

The volume between reactor vessel 70 and containment vessel 10 may be partially or completely evacuated to reduce heat transfer from the reactor vessel 70 to the reactor pool. However, in other implementations, the volume between reactor vessel 70 and containment vessel 10 may be at least partially filled with a gas and/or a liquid that increases heat transfer between the reactor and containment vessels.

In the illustrated implementation, reactor core 20 is submerged within a liquid primary coolant 80, such as water. In some versions, the primary coolant may include boron or other additives; however, other implementations of the LWR 105 may be boron-free, in that the primary coolant does not include boron (or contains an insignificant amount of boron). A boron-free primary coolant in the LWR 105 may include several advantages. For example, the liquid primary coolant 80 may boil in or just above the core 20 (as described more fully below). Also, cost may be significantly reduced in manufacturing and/or operating the LWR 105.

As illustrated, a liquid level 45 of the liquid primary coolant 80 is located at or just above a top of the core 20, and below the steam generator 42. During normal operation, the liquid primary coolant 80 boils in or above the core 20 and vaporizes into vapor primary coolant (represented by arrow 40), which, when heated, rises into channel 30 formed within the riser positioned above the core 20. The vapor primary coolant 40 contacts heat exchangers 50 and 60 of the steam generator 42 and condenses (e.g., changes phase) when in contact with the heat exchangers 50, 60 (e.g., due to a temperature difference between the vapor primary coolant 40 and the secondary coolant in the heat exchangers 50, 60.

The condensed primary coolant (e.g., liquid primary coolant 80) is circulated (e.g., by gravity) down an annulus 32 toward a bottom portion of the reactor vessel 70. As illustrated, a liquid level 43 of the liquid primary coolant 80 in the annulus 32 may be slightly above the liquid level 45 but still below the steam generator 42. The condensed primary coolant, when in contact with reactor core 20, is heated and vaporized, which again rises through channel 30. Although heat exchangers 50 and 60 are shown as two distinct elements in FIG. 1, heat exchangers 50 and 60 may represent any number of helical (or other shape) coils that wrap around at least a portion of channel 30.

In the illustrated implementation, normal operation of the nuclear reactor module proceeds in a manner wherein boiled or vaporized primary coolant 40 rises through the channel 30 and makes contact with heat exchangers 50 and 60, where it condenses. After condensing, the liquid primary coolant 80 sinks towards the bottom of reactor vessel 70 in a manner that induces a thermal siphoning process. In the example of FIG. 1, primary coolant within reactor vessel 70 remains at a saturation pressure, thus allowing vaporization (e.g., boiling) of the primary coolant in the core 20.

In the illustrated implementation, a downcomer region (e.g., annulus 32) between the reflector 15 and the reactor vessel 70 provides a fluid path for the liquid primary coolant 80 to flow between the riser 30 and the reactor vessel 70 from a top end of the vessel 70 and a bottom end of the vessel 70 (e.g., below the core 20). The fluid path channels liquid primary coolant 80 that has yet to be recirculated through the core 20 into convective contact with at least one surface of the reflector 15 in order to cool the reflector 15.

In accordance with the above description, the primary coolant forms a primary coolant circuit that extends from the pool of water in the bottom portion of the reactor pressure vessel, up through the interior of the steam generator (as channeled by the riser), down through a space defined between the steam generator (and/or the riser) and the sidewalls forming the reactor pressure vessel, and finally returning to the pool again at the bottom of the reactor pressure vessel.

In the illustrated implementation, as secondary coolant (labeled as "feed water") within heat exchangers 50 and 60 increases in temperature, the secondary coolant may begin to boil. As the feed water within heat exchangers 50 and 60 begins to boil, vaporized feed water (labeled as "steam") may be used to drive one or more turbines that convert the thermal potential energy of steam into electrical energy. In the illustrated implementation, after condensing, secondary coolant, or feed water, is returned to locations near the base of heat exchangers 50 and 60.

The steam is circulated to generate electricity with a turbine 132 and generator 134. For example, the steam may enter the turbine 132 as a high temperature/high pressure superheated vapor (or dry, saturated vapor) to drive the turbine 132 and leave the turbine 132 as a low temperature/low pressure saturated vapor. The generator 134, coupled to the turbine 132, generates electrical power as the turbine 132 rotates. The low temperature/low pressure saturated vapor enters a condenser 136, where it returns to a low temperature/low pressure liquid (feed water) and is circulated by a pump 138 back to the condensing steam generator 42.

Figure 2:
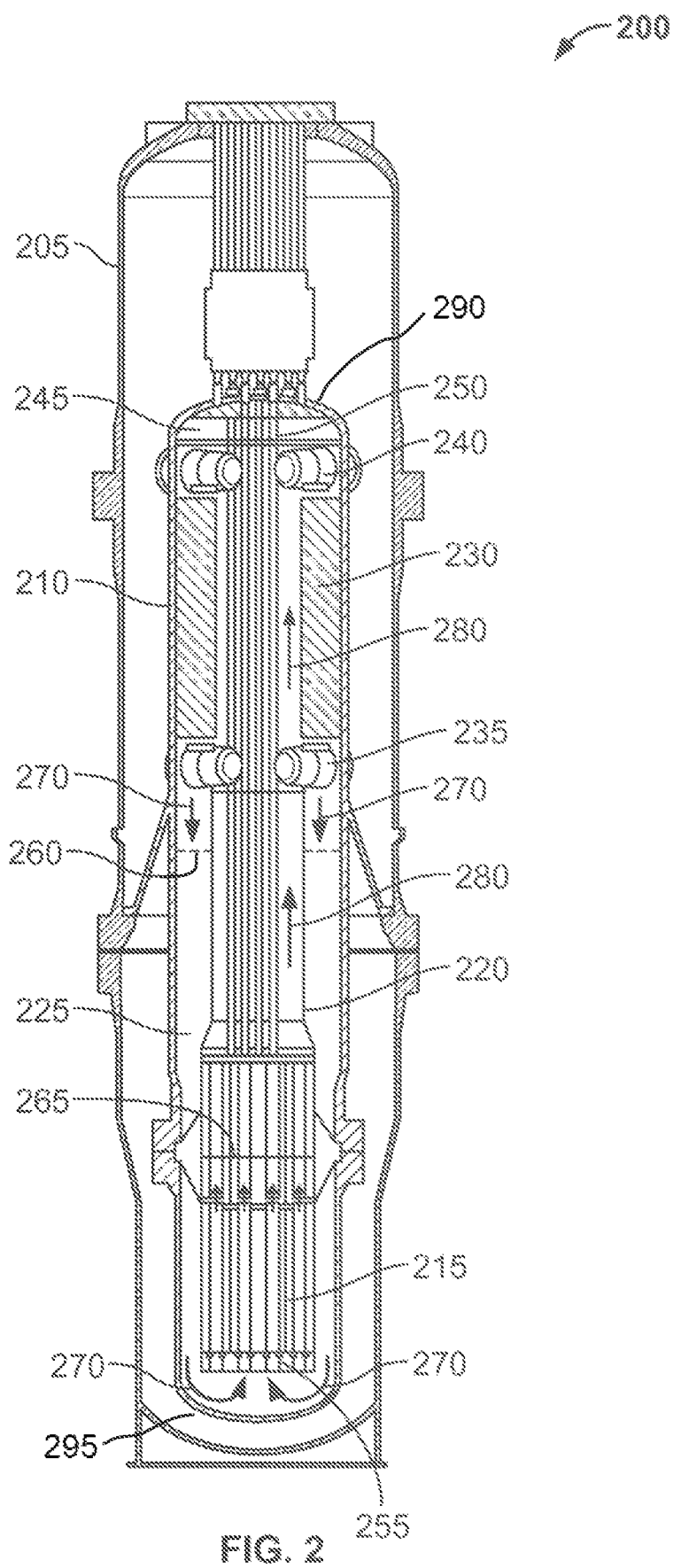
FIG. 2 illustrates an example implementation of a self-pressurizing LWR in accordance with the present disclosure.

FIG. 2 illustrates a schematic of an example implementation of a self-pressurizing light water reactor (LWR) 200. In some versions, the LWR 200 may be the same or similar to the LWR 105 shown in FIG. 1. For example, in some versions, the illustrated LWR 200 may include a condensing steam generator on which a primary coolant condenses to transfer heat from the primary coolant to a secondary coolant circulating within the steam generator 230. Further, in some versions, the illustrated LWR 200 may operate (e.g., during normal operation), at a saturation pressure of the primary coolant that is circulated within a reactor pressure vessel of the LWR 200. In some versions, the primary coolant of the LWR 200 may be boron-free (e.g., contain no or negligible amounts of boron or other similar additive).

The illustrated example of LWR 200 includes a containment vessel 205 that defines a first volume into which a reactor pressure vessel 210 is positioned. The first volume may be evacuated or contain a fluid, e.g., for transferring heat from the reactor pressure vessel 210 to a heat sink external to the containment vessel 205. A control rod system that includes one or more control rods 250 is positioned near a top 290 of the first volume so that the control rods 250 extend from the first volume, through the reactor pressure vessel 210, and into a second volume defined by the reactor pressure vessel 210. Generally, the control rods 250 may be adjusted (e.g., moved up or down) to control (e.g., start-up, shut-down, or otherwise) operation of the LWR 200.

A core 215, comprising one or more nuclear fuel assemblies and a reflector, is positioned on a core support 255 at or near a bottom end 295 of the reactor pressure vessel 255. Generally, the core 215 may be positioned to allow a flow of liquid coolant 270 to circulate through the bottom portion of the reactor pressure vessel 210 and upward through the core 215, as indicated by the arrows 270.

A riser 220 extends in the reactor pressure vessel 210 upward from the core 215 through the second volume. As illustrated, an annulus 225 is formed in the second volume that is between the riser 220 and an inner surface of the reactor pressure vessel 210. Liquid coolant 270 may be contained in the annulus 225 to circulate from the annulus 225 to the core 215. In this example, a liquid level 260 of the liquid coolant 270 may be held relatively constant, during normal operation, around the riser 220 between the core 215 and the steam generator 230.

The riser 220 extends above the core 215 and up to a steam generator 230, which includes one or more heat exchangers (e.g., tubular, helical, or otherwise). In this example, the steam generator 230 may be a condensing steam generator 230, such that, for instance, during normal operation, the primary coolant experiences a phase change (e.g., from vapor to liquid) on an outer surface of the steam generator 230 to transfer heat from the primary coolant to the secondary coolant.

As illustrated, the condensing steam generator 230 includes at least one secondary coolant inlet 235 and at least one secondary cooling outlet 240. In some implementations (and as described more fully below), a feed water supply (as the secondary coolant) may be circulated to the inlet 235, vaporized (e.g., from heat transferred to the feed water from the primary coolant), and circulated from the outlet 240 as steam. The steam secondary coolant may then be circulated to an electrical power generation system (e.g., as described in FIG. 1).

In this example, the primary coolant circulates in a flow path that is fully contained in the reactor pressure vessel 210 and fluidly isolated from the secondary coolant. The secondary coolant circulates in a flow path that breaches the LWR 200 (e.g., both the containment vessel 205 and the reactor pressure vessel 210) from an exterior location (e.g., where the power generation system is located) but is still fluidly isolated from the primary coolant. Thus, no radioactive coolant (e.g., the primary coolant) escapes the LWR 200 (during intended normal operation).

A portion of the second volume (i.e., defined within the reactor pressure vessel 210) that is located above the condensing steam generator 230 includes a saturated steam dome 245. As illustrated, this portion of the volume of the reactor pressure vessel 210 may be relatively free of structure (e.g., may only include the control rods 250 extending therethrough), such as a pressurizer. For instance, in this example implementation, the LWR 200 does not include a pressurizer (e.g., baffles and/or heaters) mounted in the saturated steam dome 245. Thus, a height of the LWR 200 may be reduced as compared to conventional pressurized water reactors. Indeed, along with the use of the condensing steam generator 230, the absence of a pressurizer may allow for the LWR 200 to be shorter than conventional pressurized water reactors.

Figure 3:
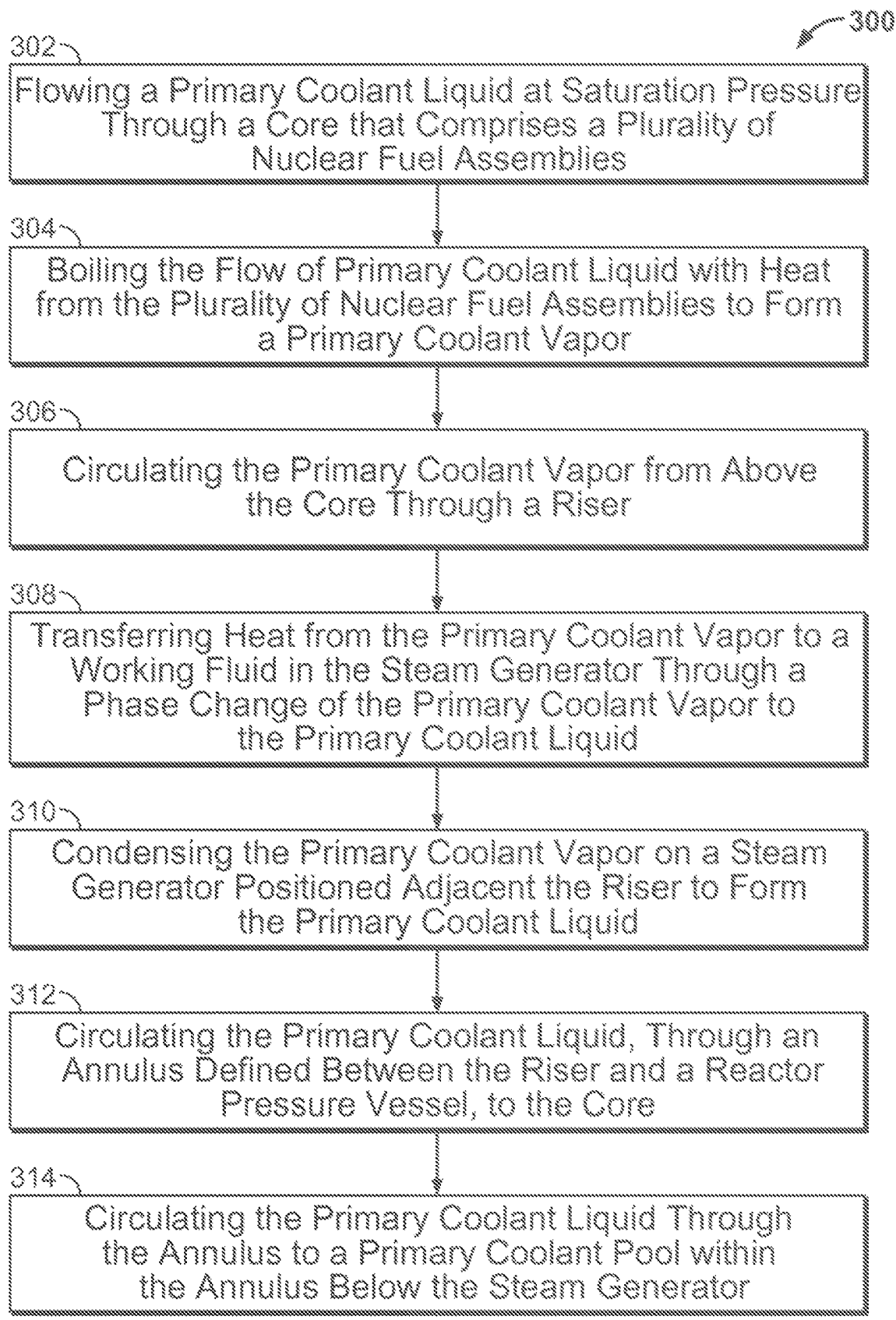
FIG. 3 is a flowchart that describes an example method for producing electrical power from a nuclear reactor power module.

FIG. 3 is a flowchart that describes an example method 300 for producing electrical power from a nuclear reactor power module. In some implementations, method 300 may describe a normal operating mode for the LWR 200 shown in FIG. 2. Method 300 may begin at step 302, which includes flowing a primary coolant liquid at saturation pressure through a core that comprises a plurality of nuclear fuel assemblies. With reference also to FIG. 2, the primary coolant liquid 270, at saturation pressure, is circulated through the core 215, where heat from nuclear fuel assemblies may be transferred to the primary coolant liquid 270.

Method 300 may also include step 304, which includes boiling the flow of primary coolant liquid with heat from the plurality of nuclear fuel assemblies to form a primary coolant vapor. Here, the primary coolant liquid 270 at saturation receives heat from the nuclear fuel assemblies and changes phase (e.g., boils) to a flow of primary coolant vapor 280. In this example, a liquid line 265, maintained at or above the core 215, defines a boiling surface of the primary coolant.

Method 300 may also include step 306, which includes circulating the primary coolant vapor from above the core through a riser. In this step, the primary coolant vapor 280 circulates (e.g., naturally due to temperature/pressure differences) from the liquid line 265, through the riser 220, and toward the condensing steam generator 230. Notably, in this example of the LWR 200, no pumps or other mechanical circulation means are used to circulate primary coolant within the reactor pressure vessel 210.

Method 300 may also include step 308, which includes transferring heat from the primary coolant vapor to a working fluid in the steam generator through a phase change of the primary coolant vapor to the primary coolant liquid. The primary coolant vapor 280 circulates into contact with an exterior surface of the condensing steam generator 230 (e.g., one or more heat exchangers), through which circulates the secondary coolant from the inlet 235 (e.g., feed water). Based on a temperature difference between the primary coolant vapor 280 and the secondary coolant feed water (e.g., where the secondary coolant feed water is below a condensation temperature of the primary coolant vapor 280), phase change of the primary coolant vapor 280 begins as heat is transferred to the feed water.

Method 300 may also include step 310, which includes condensing the primary coolant vapor on a steam generator positioned adjacent the riser to form the primary coolant liquid. As more heat is transferred from the primary coolant vapor 280 to the secondary coolant feed water, the primary coolant vapor 280 near or in contact with the condensing steam generator 230 condenses to the primary coolant liquid 270.

Method 300 may also include step 312, which includes circulating the primary coolant liquid, through an annulus defined between the riser and a reactor pressure vessel, to the core. The primary coolant liquid 270 near or in contact with the condensing steam generator 230 condenses and circulates (e.g., by gravity) through the annulus 225 toward the core 215 (e.g., toward a bottom end of the reactor pressure vessel 210).

Method 300 may also include step 314, which includes circulating the primary coolant liquid through the annulus to a primary coolant pool within the annulus below the steam generator. In this example implementation, a primary coolant pool 260 is enclosed within the annulus 225 and may be maintained between the core 215 and the condensing steam generator 230, as liquid 270 continually circulates through the core 215 and vapor 280 continually circulates to the pool 260.

While the preferred embodiment of the invention has been illustrated and described, as noted above, many changes can be made without departing from the spirit and scope of the invention. Accordingly, the scope of the invention is not limited by the disclosure of the preferred embodiment. Instead, the invention should be determined entirely by reference to the claims that follow.

What is claimed is:

1. A light water reactor, comprising:
    a reactor pressure vessel that defines a volume;
    a core positioned in a bottom portion of the reactor pressure vessel and configured to support a plurality of nuclear fuel assemblies;
    a riser within the volume of the reactor pressure vessel, the riser extending from a position above the core and toward a top portion of the reactor pressure vessel; and
    a condensing steam generator positioned adjacent the riser and within the reactor pressure vessel volume, where a primary coolant comprises a liquid pooled at the bottom portion of the reactor pressure vessel, the pool having an upper surface positioned between the bottom portion of the reactor pressure vessel and a bottom of the condensing steam generator such that the condensing steam generator is not in contact with the liquid pooled at the bottom portion of the reactor pressure vessel during normal operation of the light water reactor and an upper portion of the volume located above the condensing steam generator includes a saturated steam dome absent a pressurizer,
    wherein the light water reactor is a self-pressurizing pressurized water reactor (PWR).

2. The light water reactor of claim 1, further comprising a primary coolant circuit entirely within the reactor pressure vessel volume, the primary cooling circuit extending along a path through the core, through an interior of the riser, along an exterior of the riser, and back through the core.

3. The light water reactor of claim 2, wherein a volume of the primary coolant and the primary coolant circuit are configured to guide a flow of the primary coolant through the primary coolant circuit at a saturation pressure of the primary coolant.

4. The light water reactor of claim 1, wherein the primary coolant is boron-free.

5. The light water reactor of claim 1, wherein the upper surface of the pool is positioned below the condensing steam generator and above the core.

6. The light water reactor of claim 5, further comprising:
    a containment vessel enclosing the reactor pressure vessel;
    a feed water input circuit extending through the containment vessel and the reactor pressure vessel to the condensing steam generator; and
    a steam output circuit extending through the containment vessel and the reactor pressure vessel to the condensing steam generator.

7. The light water reactor of claim 5, wherein the reactor pressure vessel is configured to contain pressures within a range between 1150 psia to 1750 psia.

8. The light water reactor of claim 3, further comprising a secondary coolant circuit thermally coupled to the primary coolant circuit through the condensing steam generator, the secondary coolant circuit controllable to maintain the flow of the primary coolant through the primary coolant circuit at the saturation pressure of the primary coolant.

9. The light water reactor of claim 1, wherein the reactor pressure vessel is pressurizer-less.

10. A light water reactor, comprising:
   a reactor pressure vessel that defines a volume, the reactor pressure vessel having a bottom portion and a top portion, the top portion forming an interior dome;
   a core positioned in the reactor pressure vessel and configured to support a plurality of nuclear fuel assemblies;
   a condensing steam generator positioned within the reactor pressure vessel volume between the core and the top portion of the reactor pressure vessel, the condensing steam generator defining an interior pathway through the condensing steam generator and an exterior annulus between the steam generator and a sidewall forming the reactor pressure vessel, where a liquid coolant surface level of a primary coolant is positioned below a bottom of the condensing steam generator and above the core such that the condensing steam generator is not in contact with the liquid coolant surface of the primary coolant during normal operation of the light water reactor and an upper portion of the volume located above the condensing steam generator includes a saturated steam dome absent a pressurizer;
   a primary coolant circuit that extends through the core, continues in a direction from the bottom portion toward the top portion through the interior pathway of the condensing steam generator, continues in a direction from the top portion toward the bottom portion through the exterior annulus, and returns to the core to recirculate through the primary coolant circuit; and
   the primary coolant comprising a boron-free liquid,
   wherein the light water reactor is a self-pressurizing pressurized water reactor (PWR).

11. The light water reactor of claim 10, further comprising a riser extending above the core and toward the condensing steam generator.

12. The light water reactor of claim 10, further comprising:
   a containment vessel enclosing the reactor pressure vessel;
   a feed water input circuit extending through the containment vessel and the reactor pressure vessel to the condensing steam generator; and
   a steam output circuit extending through the containment vessel and the reactor pressure vessel to the condensing steam generator.

13. The light water reactor of claim 10, wherein the primary coolant comprises water.

14. The light water reactor of claim 10, wherein the primary coolant circuit is configured to enclose a primary coolant flow at a saturation pressure of the primary coolant.

15. The light water reactor of claim 14, further comprising a secondary coolant circuit thermally coupled to the primary coolant circuit through the condensing steam generator, the secondary coolant circuit controllable to maintain the flow of the primary coolant through the primary coolant circuit at the saturation pressure of the primary coolant.

16. A method for operating a light water reactor that is a self-pressurizing pressurized water reactor (PWR), the method comprising:
   flowing a primary coolant liquid at saturation pressure through a core that comprises a plurality of nuclear fuel assemblies;
   boiling the primary coolant liquid with heat from the plurality of nuclear fuel assemblies to form a primary coolant vapor;
   circulating the primary coolant vapor from above the core through a riser;
   condensing the primary coolant vapor on a steam generator positioned adjacent the riser to form the primary coolant liquid;
   circulating the primary coolant liquid, through an annulus defined between the riser and a reactor pressure vessel, to the core; and
   maintaining a top water level of the primary coolant liquid at a level between a top of the core and a bottom of the steam generator such that the steam generator is not in contact with the top water level of the primary coolant liquid during normal operation of the self-pressurizing PWR and an upper portion of the reactor pressure vessel located above the steam generator operates absent a pressurizer.

17. The method of claim 16, wherein the primary coolant liquid comprises a boron-free liquid.

18. The method of claim 16, wherein the boiling occurs at a position below the steam generator.

19. The method of claim 16, further comprising transferring heat from the primary coolant vapor to a working fluid in the steam generator through a phase change in the primary coolant vapor to the primary coolant liquid.

20. The method of claim 19, further comprising:
   circulating the working fluid in the steam generator to a secondary coolant circuit that is fluidly coupled to a power generation system; and
   controlling the circulation of the working fluid in the secondary coolant circuit to maintain the flow of the primary coolant liquid at saturation pressure.

* * * * *